United States Patent [19]

Hack et al.

[11] 4,084,201
[45] Apr. 11, 1978

[54] MAGNETIC DISC, ESPECIALLY A FLEXIBLE MAGNETIC DISC, FOR TRACK ADJUSTMENT AND AMPLITUDE CONTROL

[75] Inventors: Joachim Hack; Udo Himmelmann; Peter Rudolf; Klaus Schulze-Berge, all of Ludwigshafen; Karl-Heinz Meyer, Dackenheim, all of Germany

[73] Assignee: BASF Aktiengesellschaft, Ludwigshafen, Rhineland, Germany

[21] Appl. No.: 671,385

[22] Filed: Mar. 29, 1976

[51] Int. Cl.$^2$ .............................................. G11B 21/10
[52] U.S. Cl. ........................................ 360/135; 360/77
[58] Field of Search ............... 360/135, 134, 136, 77, 360/78

[56] References Cited

U.S. PATENT DOCUMENTS

| 3,479,664 | 11/1969 | Stuart-Williams et al. | 360/77 |
| 3,742,470 | 6/1973 | Ha et al. | 360/77 |
| 3,900,888 | 8/1975 | Uchikoshi et al. | 360/77 |
| 3,914,793 | 10/1975 | Burnham | 360/77 |
| 3,919,697 | 11/1975 | Walker | 360/77 |

FOREIGN PATENT DOCUMENTS

| 2,317,159 | 10/1973 | Germany | 360/77 |
| 2,439,546 | 2/1976 | Germany | 360/77 |
| 1,120,731 | 12/1961 | Germany | 360/77 |
| 1,398,690 | 6/1975 | United Kingdom | 360/76 |

OTHER PUBLICATIONS

IBM Tech. Discl. Bulletin, vol. 17, No. 4, Sept. 1974, "Track Following Servo Indicator", by B. C. Fiorino.

Primary Examiner—John H. Wolff
Attorney, Agent, or Firm—Keil, Thompson & Shurtleff

[57] ABSTRACT

The invention relates to a magnetic disc for track adjustment and amplitude control having at least one control track with magnetic control signals, this track being arranged in the central region of the recording area, and the control signals consisting of two different signals. The invention also relates to the geometric arrangement of the control signals in the track, their number, their amplitude, their frequency and their duration.

10 Claims, 5 Drawing Figures

MAGNETIC DISC, ESPECIALLY A FLEXIBLE MAGNETIC DISC, FOR TRACK ADJUSTMENT AND AMPLITUDE CONTROL

This invention relates to a magnetic disc, especially a flexible magnetic disc, for track adjustment and amplitude control (hereinafter referred to as "adjustment and control disc") having at least one control track with magnetic control signals.

With a magnetic disc, the writing or reading of data is effected through the movement, by means of a drive unit, of the disc relative to a magnetic head.

The quality of the writing or reading operation is determined by the exact positioning of the magnetic head above the tracks of the recording medium as they move relative to one another. Especially in the case of floppy discs and their associated write and read apparatus it is important that the magnetic head and/or the head adjustment unit in particular should be able to be displaced relative to the recording medium. This operation is referred to as "track adjustment". So-called CE discs bearing control signals are used for this purpose in the case of rigid magnetic discs. Such control signals consist of magnetic flux changes numbering approximately 26,000 which extend alternately on either side of the center line of the track. With this digital information track adjustment can be effected, but the physical properties of the disc and/or the functioning of the drive unit cannot be checked.

A further CE disc is known which has two signals displaced relative to the center line of the track, which signals when read sequentially, show that the head is adjusted correctly relative to the track when the said two signals cannot be distinguished on an oscillograph. A control method of this kind requires special read and decoding means, as well as a special video terminal.

The object of the present invention is to provide a magnetic adjustment and control disc which is more versatile than prior art CE discs and can be used without any additional equipment.

This object is achieved with a magnetic adjustment and control disc, especially a flexible magnetic adjustment and control disc, having at least one track with magnetic control signals, wherein the said track is arranged in the central region of the recording area and the control signals consist of orientation signals and adjustment signals, the adjustment signals extending alternately on either side of the centerline of the track, and the orientation signals having a different amplitude than the adjustment signals and being arranged so as to split up the adjustment signals into a plurality of groups.

According to the invention, therefore, two signals which can be clearly distinguished from each other on a measuring instrument are used as control signals. Although it is very advantageous to employ only two control signals, i.e. orientation and adjustment signals, more than two control signals may be used.

With the adjustment and control disc according to the invention, the whole length of the control track can be displayed on an oscillograph, as a result of which any eccentricity of the disc on the drive can be ascertained, and the disc can be optimally read despite this eccentricity.

In an advantageous embodiment of the invention, the orientation and adjustment signals are arranged symmetrically with respect to the central hole in the disc. In this way, a reference centricity is obtained.

In a further advantageous embodiment of the invention, the number of signal groups on the disc may vary between 4 and 36; preferably 6 or 12 groups are chosen, as a result of which the individual signals can be displayed on the screen of any commercially available oscilloscope.

In yet another advantageous embodiment according to the invention, the amplitudes of the orientation signals are at least 10% larger than the amplitudes of the adjustment signals. As a result, the oscilloscope can be reliably triggered by the orientation signals.

The orientation signals may conveniently have frequencies different to the frequency of the adjustment signals, which makes it easier to distinguish the signals from one another.

Advantageously, the adjustment signals have the lower frequency of the two recording frequencies of the data system, so that the maximum signal amplitude can be measured by the read head.

In a further embodiment of the invention, the orientation signals consist of three signals, namely a central signal having the lower frequency of the two recording frequencies, and two adjacent signals having the higher frequency of the two recording frequencies.

As a result, the orientation signals are even easier to distinguish from the adjustment signals, and the frequency of the adjacent signals, equaling the higher of the two recording frequencies, can be used for adjusting the azimuth angle of the read head and for checking the amplifier.

To sum up, then, the advantages of the adjustment and control disc of the invention are as follows:

Track adjustment and a check on the track adjustment are possible therewith. It can be used to ascertain any disc eccentricity which occurs during loading, any disc deformation produced, for example, by climatic conditions, and any out-of-true running of the disc-bearing spindle. Moreover, it can be employed to check the functioning of the magnetic head and to adjust the azimuth angle of the head without there being any need for more than an oscilloscope such as in usually employed for servicing.

Finally, control signals of approximately the same length may be used, the length being preferably 1 = arc 6.6°.

Further details of the invention are disclosed in the following description of one embodiment of the adjustment and control disc illustrated in the accompanying drawings, in which FIG. 1 is a schematic view of an adjustment and control system with an adjustment and control disc according to the invention;

Figure 1:
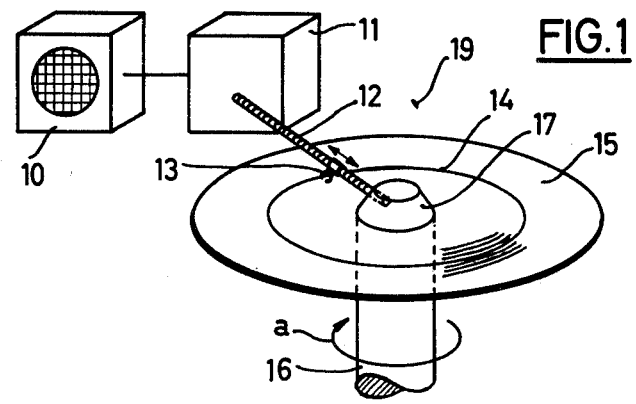

The adjustment and control system 19 consists essentially of a drive shaft 16, a magnetic adjustment and control disc 15, a head positioning device 11 with spindle 12 and magnetic head 13, and an oscilloscope 10 which is connected up to the magnetic head 13 via the device 11. The magnetic head 13 can be moved on the spindle 12 in the directions indicated by the double arrow. The numeral 14 denotes a circular track in the central region of the recording area of the disc 15. In the case of a floppy disc this may for example be track no. 36 if the total number of tracks is 76. Arrow $a$ indicates the direction of rotation of the drive shaft 16. The upper end 17 of the drive shaft, which protrudes through the disc 15, is slightly conical in order to facilitate mounting of the disc 15 thereon.

Figure 2:
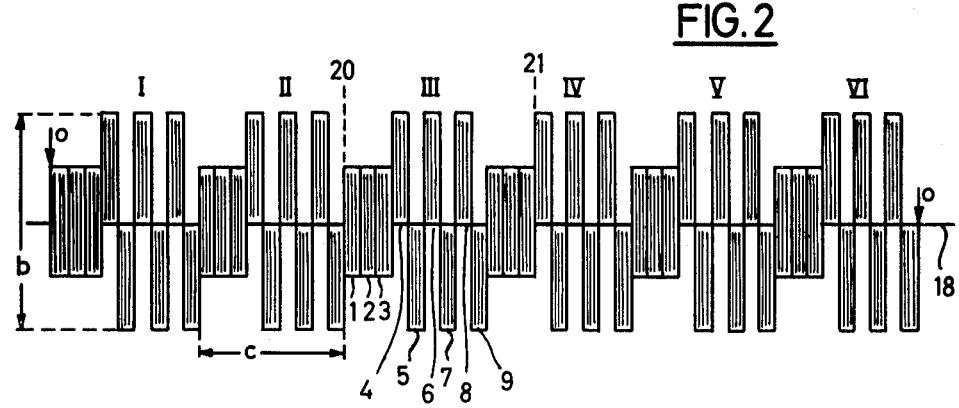
FIG. 2 shows the geometric arrangement of the control signals, immediately succeeding one another, in one of the tracks in the middle of the disc.
Figure 3:
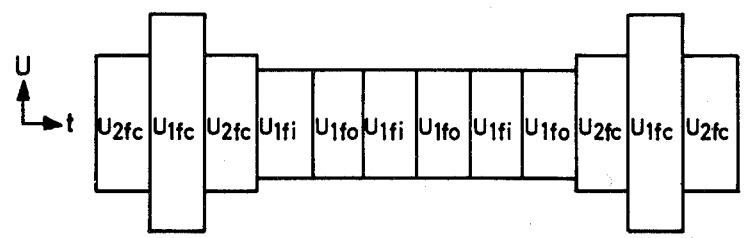
FIG. 3 shows a group of control signals between the dashed lines 20 and 21 in FIG. 2, the disc being without any eccentricity.

FIG. 2 shows one possible arrangement of the control signals which are symmetrical with respect to the center line 18 of the abovementioned track no. 36. The reference symbol $b$ indicates the width of the track. The control signals are composed of a multitude of magnetic flux changes. A total of six groups of signals — I to VI — can be seen in FIG. 2, each of these groups having a length $c$. Each group consists of three orientation signals 1 to 3 which are arranged symmetrically on the center line 18 of the track, and of six adjustment signals 4 to 9 which extend alternately on either side of the center line 18. The amplitudes of the orientation and adjustment signals should be different, so that the signals can be readily distinguished from one another. This can be achieved, for example, if orientation signals 1 to 3 consist of alternating signals of different frequency, e.g. of $2f$, $1f$, $2f$. Here, the frequencies $2f$ and $1f$ are the recording frequencies of the data system. In the case of the floppy disc system, these frequencies are 500 kHz and 250 kHz at 360 rpm. FIG. 3 shows an oscillogram of the signals between the dashed lines 20 and 21 (cf. FIG. 2) which include orientation signals 1 to 3 and adjustment signals 4 to 9 of group II, as well as orientation signals 1 to 3 of group IV. As indicated in the drawing, the read voltage U, scanned by the magnetic head 13, is plotted on the vertical axis as a function of time t (horizontal axis).

The orientation signals 1 to 3 are distinguishable as read voltages U2$fc$, U1$fc$ and U2$fc$, the voltage U1$fc$ being displayed with a larger amplitude than U2$fc$. In the illustrated embodiment, the amplitudes of read voltages U1F$i$ and U1$fo$ are the same. Since the amplitudes of the read voltages produced by the magnetic head 13 depend upon the position of the head relative to the control track 14, the fact that the read voltages U1$fi$ and U1$fo$ have the same amplitude shows that a. the position of the head relative to the tracks is correct, b. the adjustment and control disc is situated absolutely centrically on the drive shaft, c. the hole in the disc (floppy disc) is circular and the disc itself is not deformed, d. the drive shaft is running true, and e. the magnetic head is functioning properly.

Figure 4:
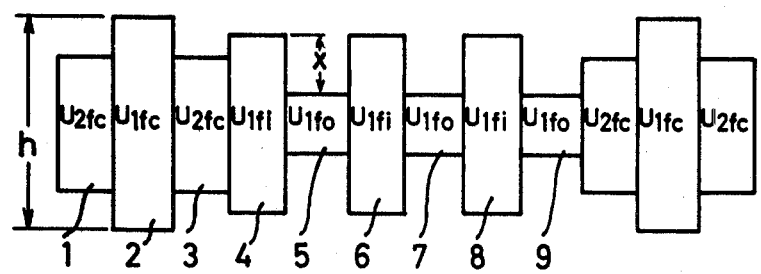
FIG. 4 shows a group of control signals in the case of a disc sector displaced towards the drive shaft of the unit.
Figure 5:
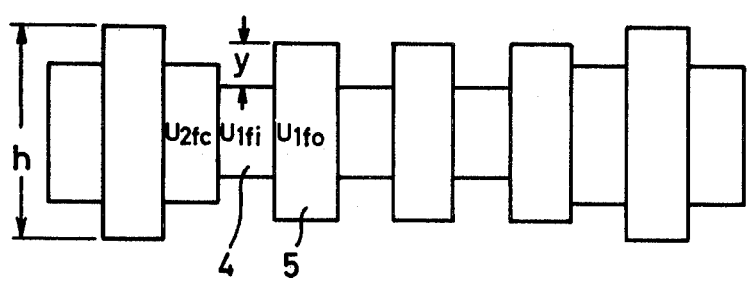
FIG. 5 shows a group of control signals in the case of a disc sector displaced away from the drive shaft.

FIGS. 4 and 5 show the read voltages U2$fc$, U1$fc$, U1$fi$ and U1$fo$ which correspond to the voltages shown in FIG. 3 only as far as their designation and their geometric position are concerned. Viewed from the left, burst 4 of FIG. 4, i.e. the read voltage U1$fi$, has an amplitude larger than the following burst 5, i.e. the read voltage U1$fo$. This amplitude difference (U1$fi$−U1$fo$) (x), which is positive, shows that a sector of the disc 15 is displayed towards the axis of the drive shaft. If the amplitude difference (U1$fi$−U1$fo$) is negative $(y)$, as in FIG. 5, this means that a sector of the disc is displaced away from the axis of the drive shaft. The following equation can be used to determine the track displacement $\Delta s$ from the desired position:

$$\Delta s = \frac{U1fi - U1fo}{U1fi + U1fo} \times \frac{s}{2}$$

wherein the track displacement $\Delta s$ is expressed in $\mu$ and the track width s of the read head is likewise expressed in $\mu$. By adjusting the position of the head on the spindle 12 it is possible to compensate for eccentricity of the disc and/or out-of-true running of the shaft. Such compensation is advantageously accomplished by adjusting the difference in amplitude of the read voltages of signal group $n$ ($n$ being one of the groups I to VI) and the difference in amplitude of the read voltages of the group n+3 so that they are equal, by moving the magnetic head. In this way, radial eccentricity can at least be reduced to a minimum. In this example of compensating for eccentricity, the number of signal groups on a track has been assumed to be six. For a different number N of signal groups, in the case of track displacement in the sector bearing the signal group $n$ the amplitude differences of group $n$ and $n + (N/2)$ should be equalized.

The frequencies 1$f$ and 2$f$ offer themselves for this purpose, but any frequencies suitable for other disc speeds may be employed. The frequency 2$f$ of the read voltages U2$fc$ may be used advantageously for adjusting the azimuth angle of the magnetic head.

We shall not describe the fundamental procedure for adjusting the head relative to the track for a floppy disc unit:

After the disc 15 has been placed over the conical end 17 of the drive shaft 16 while the drive is running, the head is brought into read position. The oscilloscope is then connected to the read unit of the head positioning device 11. The oscilloscope is for example set to 20 millisecond scale units and triggered by the orientation burst 2. When the magnetic head is located above track no. 36 the six signal groups illustrated in FIG. 3, 4 or 5 with their specific amplitudes are displayed on the screen. The oscilloscope is then adjusted to display the maximum amplitude of U1$fc$ which should correspond to about 60 scale units on the screen.

The head 13 is then suitably displaced on the spindle 12 until the track deviation of the $n^{th}$ group corresponds to that of the $(n+3)^{th}$ group. Ideally, all signals 4 to 9 should have the same amplitude. However, since some eccentricity is usually present, this is hardly ever the case in practice. Finally, the magnetic head is locked in position. Head position accuracy can be checked as follows:

The amplitude difference x or y (FIGS. 4 and 5) is determined and a quantity Z is ascertained:

$$Z = \frac{x + y}{h} \times 360\mu = 6(x + y)n,$$

Z being the actual position of the head relative to the center line of the track on such an adjustment and control disc, and $h$ indicating the maximum amplitude of the orientation signals. Idealy, $Z = O$ if $x = y$. In practice it suffices if $x + y \leq 3.3$ scale units, so that Z is 20$\mu$ or less.

In the embodiment described here, only two kinds of signals have been employed, i.e. the orientation signals and the adjustment signals, the orientation signals being identical and the adjustment signals being identical. However, it is also possible, for example, for the adjustment signals to differ slightly from one another in amplitude and/or frequency while possessing common characteristic features which make them clearly distinguishable from the orientation signals. Moreover, the orientation signals may also differ slightly from one another if it is ensured that they can be clearly and readily distinguished from the adjustment signals.

Other embodiments of the invention which also come within the scope of protection of the claims are conceivable. Furthermore, it is obvious to those skilled in the art that the control signals are recorded on the adjustment and control disc by means of simple equipment, for example a floppy disc drive, and that other suitable measuring devices may be employed instead of the abovementioned measuring instruments.

1. A magnetic test disc having at least one test track with magnetic test signals recorded thereon, for testing disc drive apparatus by observing the frequency and amplitude of the reproduced test signals on an oscilloscope, said test signals being symmetrical with respect to said test track and comprising orientation signals and tracking-indicating signals, groups of tracking-indicating signals extending alternately on either side of the center line of the test track, and groups of orientation signals at least some of which have a visibly larger amplitude and frequency than the tracking-indicating signals and being arranged so as to split up the tracking-indicating signals into a plurality of groups.

2. A test disc according to claim 1, wherein the orientation and tracking-indicating signals are arranged symmetrically with respect to the central hole in the magnetic disc.

3. A test disc according to claim 1, wherein between 4 and 36 signal groups are provided.

4. A test disc according to claim 1, wherein either six or twelve signal groups are provided.

5. A test disc according to claim 1, wherein the amplitudes of the orientation signals are at least 10% larger than the amplitudes of the tracking-indicating signals.

6. A test disc according to claim 1, wherein the orientation signals have frequencies different than those of the tracking-indicating signals.

7. A test disc according to claim 1, wherein the test signals are of approximately the same length, the length being 1 = arc 6.6°.

8. In a magnetic disc recording system in which data in the form of signals are recorded on a number of circular tracks on flexible magnetic discs by means of a write/read head and are scanned thereby,
a flexible magnetic test disc having in the central region of its recording area at least one test track with magnetic test signals recorded thereon for testing the disc drive apparatus of said system by observing the frequency and amplitude of the reproduced test signals on an oscilloscope, being symmetrically with respect to said test track and, extending alternately on either side of the center line of the test track, and groups of orientation signals at least some of which have a visibly larger amplitude and frequency.

9. A test disc according to claim 8, wherein the orientation signals consist of three signals, i.e. a central signal having the lower frequency of the two recording frequencies, and two adjacent signals having the higher frequency of the two recording frequencies.

10. In a magnetic disc recording system a magnetic test disc according to claim 8, wherein the data are recorded in said data system at two fixed recording frequencies allocated to the system, and wherein the tracking-indicating signals have the lower frequency of the two recording frequencies of the data system.

* * * * *

UNITED STATES PATENT AND TRADEMARK OFFICE
CERTIFICATE OF CORRECTION

PATENT NO. : 4,084,201
DATED : APR. 11, 1978
INVENTOR(S) : JOACHIM HACK ET AL

It is certified that error appears in the above-identified patent and that said Letters Patent are hereby corrected as shown below:

In the Heading, insert -- [30] Foreign Application Priority Date December 2, 1975 Germany P 25 54 083.4 --

Col. 6, line 19, "produced test signals on an oscilloscope, being" should read -- produced test signals on an oscilloscope,

¶ said test signals being --

"   ",   " 20, "symmetrically with respect to said test track and," should read -- symmetrical with respect to said test track, and --

"   ",   " 21, "extending alternately on either side of the center" should read -- comprising orientation signals and tracking-indicating signals, groups of tracking-indicating signals extending alternately on either side of the center --

UNITED STATES PATENT AND TRADEMARK OFFICE
CERTIFICATE OF CORRECTION

PATENT NO. : 4,084,201
DATED : APR. 11, 1978
INVENTOR(S) : JOACHIM HACK ET AL

It is certified that error appears in the above-identified patent and that said Letters Patent are hereby corrected as shown below:

Col. 6, line 24, "amplitude and frequency" should read -- amplitude and frequency than the tracking-indicating signals and being arranged so as to split up the tracking-indicating signals into a plurality of groups.--

Signed and Sealed this

Fifteenth Day of May 1979

[SEAL]

Attest:

RUTH C. MASON
Attesting Officer

DONALD W. BANNER
Commissioner of Patents and Trademarks